Figure 1:
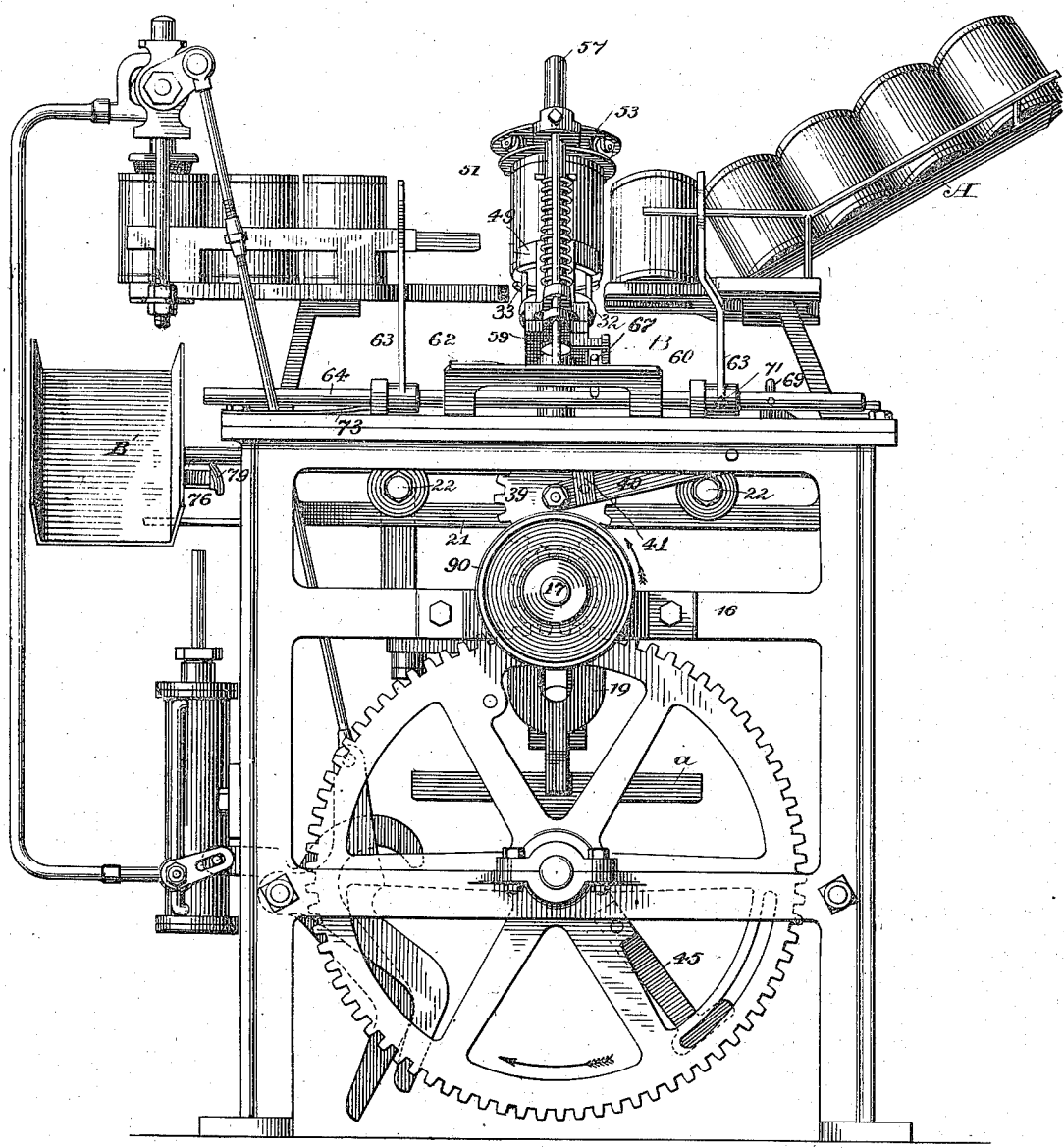

(Model.)

8 Sheets—Sheet 1.

R. GORNALL.
CAN TESTING AND SOLDERING MACHINE.

No. 246,753.  Patented Sept. 6, 1881.

Attest:
R. T. Barnes.
Frank Middleton

Inventor:
Richard Gornall
by Ellis Spear
Atty (Model.)

8 Sheets—Sheet 3.

R. GORNALL.
CAN TESTING AND SOLDERING MACHINE.

No. 246,753. Patented Sept. 6, 1881.

Attest:
R. H. Barnes.
Frank Middleton.

Inventor:
Richard Gornall
by Ellis Spear
Atty (Model.)

8 Sheets—Sheet 4.

R. GORNALL.
CAN TESTING AND SOLDERING MACHINE.

No. 246,753.

Patented Sept. 6, 1881.

Attest:
R. F. Barnes.
Frank Middleton

Inventor:
Richard Gornall
by Ellis Spear
Atty (Model.)

8 Sheets—Sheet 5.

R. GORNALL.

CAN TESTING AND SOLDERING MACHINE.

No. 246,753.

Patented Sept. 6, 1881.

Attest:
R. T. Barnes
F. L. Middleton

Inventor:
Richard Gornall
by Ellis Spear
Attorney (Model.)

8 Sheets—Sheet 6.

R. GORNALL.
CAN TESTING AND SOLDERING MACHINE.

No. 246,753.

Patented Sept. 6, 1881.

Attest:
R. F. Barnes.
F. L. Middleton

Inventor:
Richard Gornall
by Ellis Spear
Attorney (Model.)                                                8 Sheets—Sheet 7.
R. GORNALL.
CAN TESTING AND SOLDERING MACHINE.
No. 246,753.                           Patented Sept. 6, 1881.
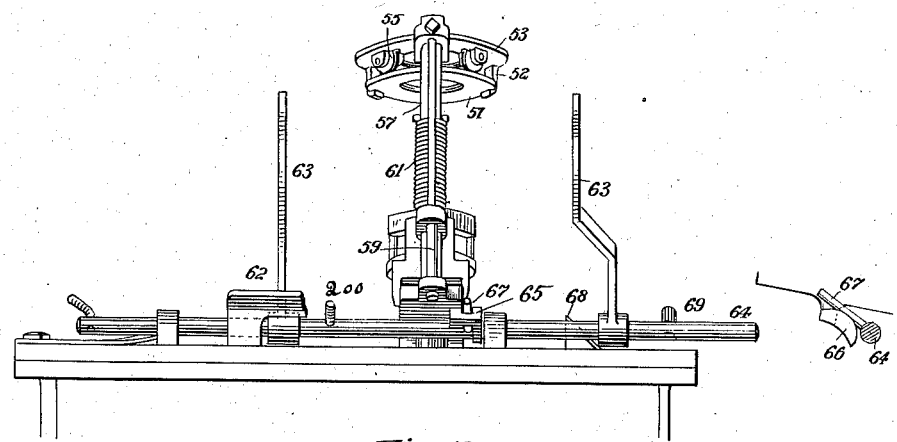
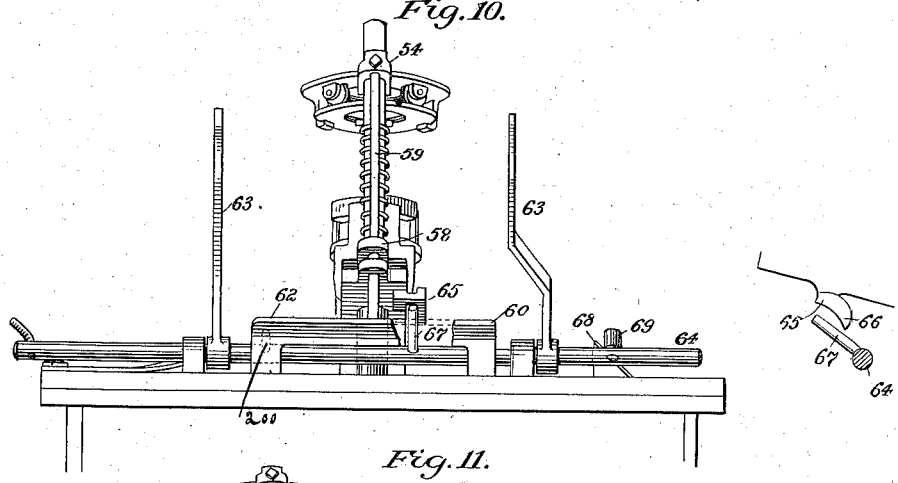
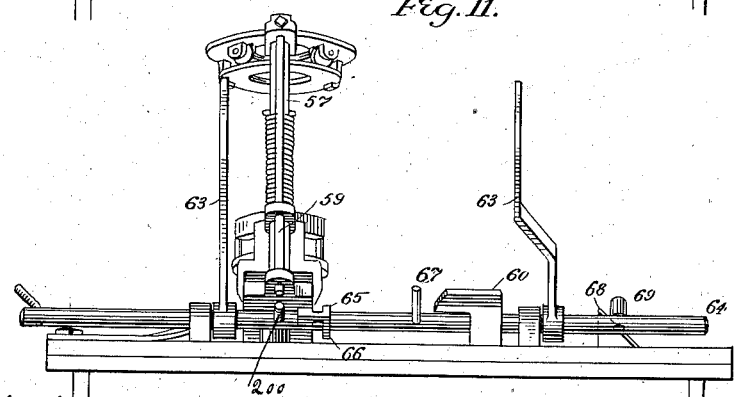
Attest:
R. F. Barnes
F. L. Middleton
Inventor:
Richard Gornall.
by Ellis Spear
Att'y.

(Model.)  8 Sheets—Sheet 8.

R. GORNALL.
CAN TESTING AND SOLDERING MACHINE.

No. 246,753.  Patented Sept. 6, 1881.

Attest:
R. F. Barnes.
Frank Middleton

Inventor:
Richard Gornall
By Ellis Spear
Atty

UNITED STATES PATENT OFFICE.

RICHARD GORNALL, OF BALTIMORE, MARYLAND.

CAN TESTING AND SOLDERING MACHINE.

SPECIFICATION forming part of Letters Patent No. 246,753, dated September 6, 1881.

Application filed February 12, 1881. (Model.)

*To all whom it may concern:*

Be it known that I, RICHARD GORNALL, of Baltimore, in the county of Baltimore and State of Maryland, have invented a new and useful Improvement in Can Soldering and Testing Machines; and I do hereby declare that the following is a full, clear, and exact description of the same.

My invention relates to machinery for soldering and testing cans of the class generally used for packing edible substances requiring an air-tight inclosure.

It consists, first, of an improved form of table or carriage, made to reciprocate for receiving and discharging the cans; second, of an automatic delivery and discharge, whereby the cans are supplied to the table or carriage and discharged therefrom without the constant aid of an attendant; and, third, in the combination, with the soldering mechanism, of a testing apparatus, whereby the cans are soldered and tested by one passage through the machine.

It consists, also, of certain details of construction, all of which are fully described hereinafter, and particularly indicated in the claims.

Heretofore machines for soldering have been devised in which supports for each can were mounted upon a circular revolving table, which, in its revolution, brought the cans in succession to that point where the heat was applied. Such machines required constant attendance to put on and remove the cans, required considerable space, and were not adapted to be used with a testing apparatus.

My object is to reduce the size of the machine and the number of supports for the cans, to simplify the structure, to render the feed and discharge automatic, and to adapt it to operate, as specified above, with the testing-machine.

Figure 2:
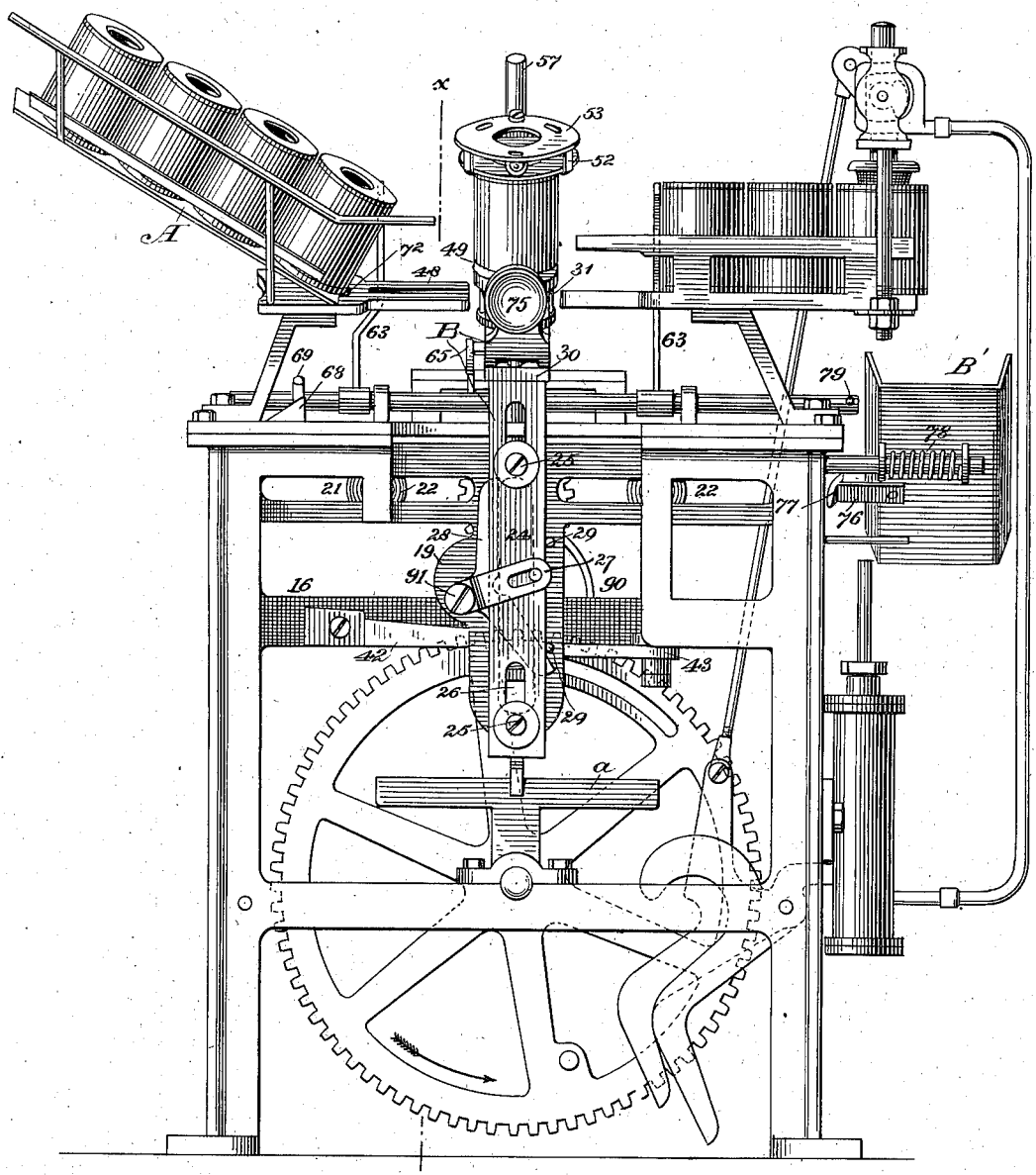
Figure 3:
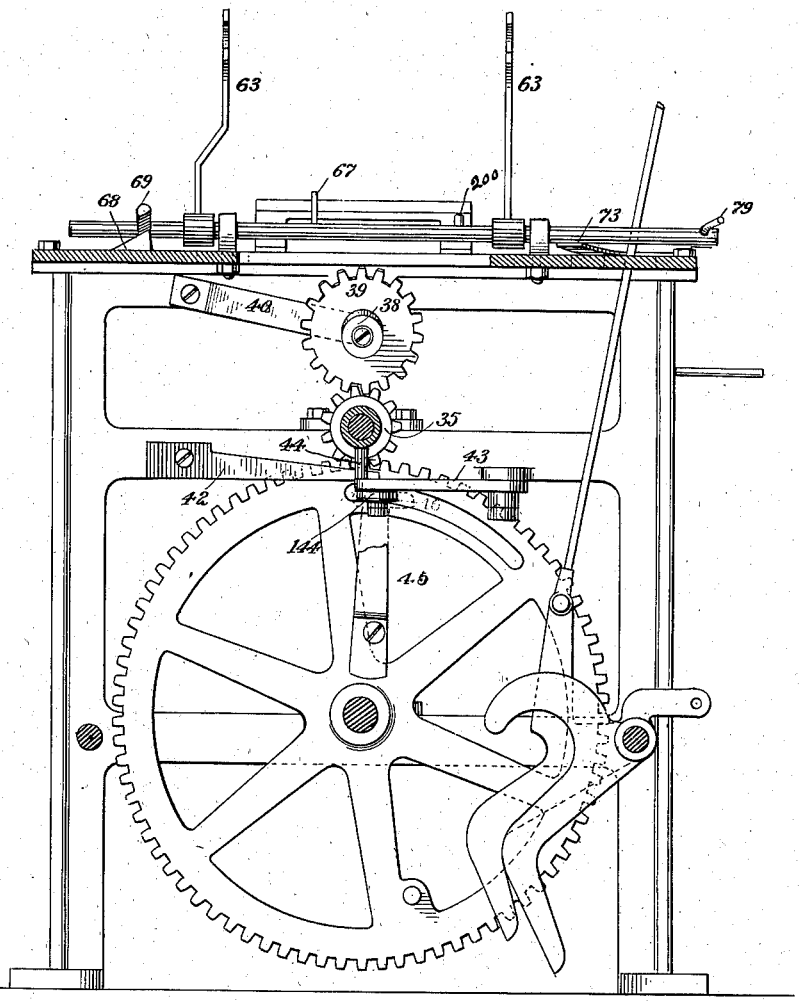
Figure 7:
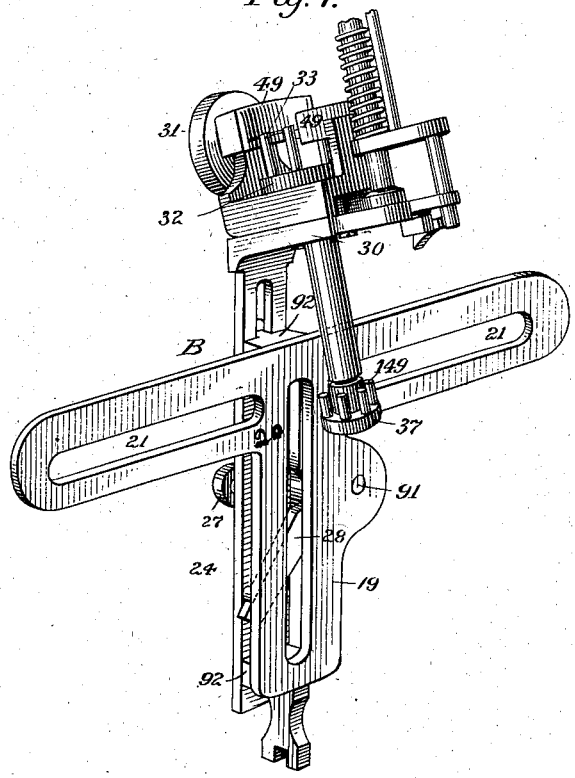
Figure 8:
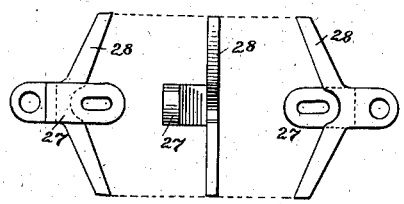
Figure 12:
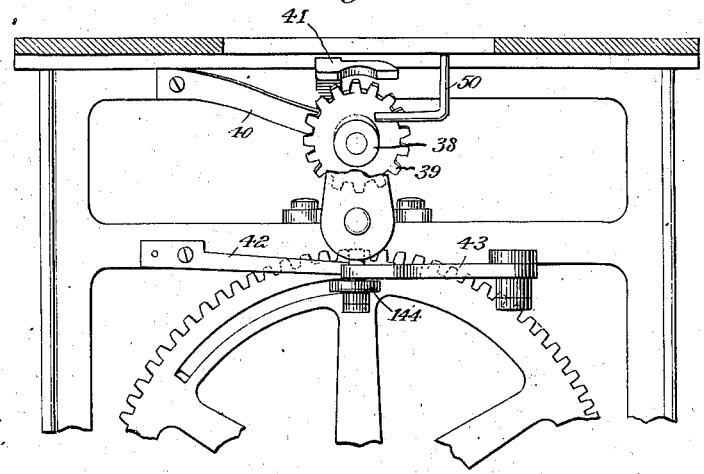
Figure 13:
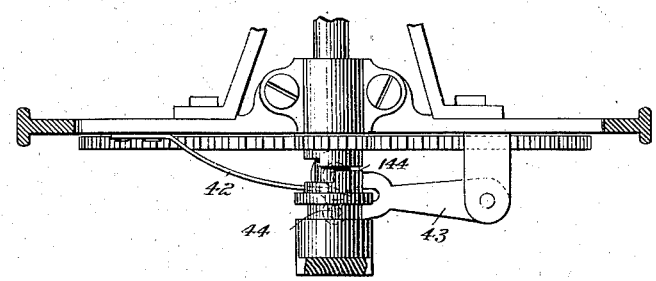
Figure 14:
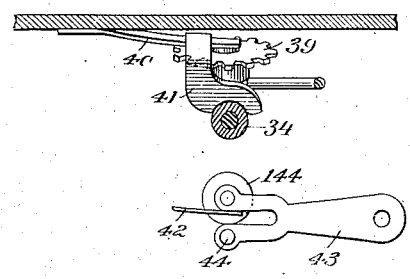

In the drawings annexed, Figure 1 shows a rear elevation; Fig. 2, a front elevation. Fig. 3 represents a section, and Fig. 4 a cross-section. Fig. 5 is an elevation showing the carriage B, the crank of the main driving-shaft, and the cam-lever. Fig. 6 shows a similar elevation, with the carriage in another position, and with the devices for raising and lowering the can-seat. Fig. 7 is a perspective view of the carriage detached, with the can-seat and rotating devices. Fig. 8 represents the cam-lever for raising and lowering the can-seat. Figs. 9, 10, and 11 are side elevations, showing the can-holding devices and devices for moving the cans forward, said figures representing these devices in different positions. Figs. 12, 13, and 14 are detail views, showing the action of the arm for holding the can-rotating shaft in a central position and the forked lever for operating the clutch.

In the machine thus illustrated the cans are supported upon a chute on the top of a long narrow table, which table, or the frame thereof, also supports the can-moving and other mechanisms. The table is provided with a strong frame, and is of a height adapted to permit the attendant to work conveniently thereat.

The chute A is supported upon the table by brackets. A part of the chute is horizontal and part inclined. The cans are set by the attendant upon the inclined end of the chute, and move forward to the other by their own weight. The inclined part should be long enough to hold a number of cans, but the horizontal part should be of a length a little exceeding the diameter of a single can. The sides of this chute are made adjustable by means of slots, in which the posts are set, which support the side rails. By this construction the side rails may be set in or out according to the size of the cans, and under all circumstances guide the cans accurately to the seat on which they are soldered. The chute on this side is slightly inclined sidewise and terminates at the end of the path of a can-seat mounted on a reciprocating carriage, B, by means of which the cans are received from the said chute, transferred to the heating appliances, and then to another chute on the opposite side, which forms, practically, a continuation of the first.

The carriage, with its seat, is designed to transfer the cans and to cause them to rotate in front of a heater, by means of which they are floated. The mechanism by which it is moved from side to side will be first described, and then that by which the cans are rotated.

In the bar 16 of the frame is mounted a driving-shaft, 17, having a driving-pulley, 90, on the front end of said shaft and a crank upon a sleeve on said shaft in the rear, as hereinafter more fully explained. The pin of this crank 18 works in a slot in the vertical arm 19 of the carriage 20, which slides on suitable ways underneath the table at the back part, as shown. These ways consist of a slotted part of the carriage (represented at 21) moving on friction-rolls 22, fixed to parts of the frame, and on a lower side rail, a, at the bottom of arm 19. It will be apparent that each revolution of the shaft will move the carriage forward and back a distance equal to twice the length of the crank-arm, which carries the pin 23, working in the slot of the vertical arm 19. A slide-bar, 24, is held upon the carriage by means of screws 25 passing through slots 26 in said bar, and vertical reciprocating motion is imparted to said bar, for purposes hereinafter explained, by means of an arm, 27, attached to a cam-lever, 28, which is pivoted at 91 on one side of the vertical slotted arm 19, which is underneath the vertically-sliding bar 24, the said bar being separated from said arm by short studs 92. This cam-lever is moved by the wrist-pin of the crank, which also moves the carriage. To effect this movement of the cam-lever the wrist-pin projects through the slot, so that in its vertical movement in the slot of the vertical arm 19 of the carriage it may impinge against the surface of the arms of the cam-lever, passing the lower in its descent and the upper arm in its ascent. Motion of the arms of the cam-lever is limited by pins 29 29. The result of the operation of this mechanism is to lift the slide-bar 24 at the rear end of its path—that is to say, that on the right of the machine, as shown in Fig. 1—and to keep it elevated during its passage forward toward the front end of said path, then to depress it and to carry it, while down, back to the rear limit, again to be lifted, and so on. This mechanism is made to serve two purposes: first and mainly, that of transferring the cans from one chute or one part of the chute to the other, and, second, the pushing forward of the cans after transfer to the testing mechanism.

It should be noted here that the movement of the carriage from right to left in the transfer of cans from the receiving to the delivery or testing end of the machine is temporarily arrested, in order to give time for the operation of another set of mechanisms, which rotate the can in front of the heating apparatus. The devices by which this is accomplished are described hereinafter.

On the upper end of the vertically-reciprocating slide-bar 24 is an arm, 30, on which the can-seat is carried. This arm is inclined toward the front side of the machine, on which side is placed the heating apparatus 31, attached to said arm. The can-seat is a disk, 32, having pins 33 set in the face around the edge, of equal length, and parallel with the axis 34 of the disk. This disk rests upon the arm 30 and has the same inclination as the arm, so that the can, when seated upon the ends of the pins, is inclined toward the heater. This inclination should be enough to cause the solder to flow around the seam, the amount of inclination required for the purpose being well-known to those skilled in the art to which this invention belongs.

The crank-arm 18 is fixed, not upon the end of the main shaft, but, as heretofore indicated, upon a sleeve, 35, fitted to said shaft, so that it turns freely thereon, except when thrown into contact with a fixed collar, 36, on the same main shaft, there being clutches on the adjacent ends of sleeve and collar adapted to interlock. When the sleeve is out of connection with the collars the shaft turns freely without moving the crank-arm on the carriage. While the crank-arm is thus unlocked and at rest the mechanism for rotating the cans is brought into action.

The lower end of the axis or shaft of the disk which supports the can is provided with wheel 37, having preferably a milled periphery, and this wheel, when the carriage is at rest opposite the heater, bears against the face (preferably of rubber) of a wheel, 38, fixed to a gear-wheel, 39, which meshes with the cog-wheel fixed to the main shaft. These wheels 38 and 39 are pivoted on a pin which is carried in the end of a spring-arm, 40, said arm being adapted to press the face of the wheel 38 against the edge of wheel 37. This spring-arm carries also a locking-arm, 41, fixed to the said spring-arm, and bending forward over the rubber-faced wheel, and having on its end prongs directly over said wheel, said prongs being adapted to receive and embrace the shaft of the can-seat in its advance toward the discharge end, and to hold it in place while turning. The pronged part is rounded or inclined on the side thereof first struck in the advance of the shaft, said shaft, by means of this incline, pushing back the spring-arm until the shaft has passed the inclined prong and is within the embrace of the two. When the shaft goes back on the return of the carriage it rides lower, and owing to its inclined position does not touch the prongs. Wheel 39 is always in gear with the pinion on the main shaft, the cogs of the latter being wide enough to permit the required lateral motion without throwing the wheel and pinion out of gear. The sleeve of the crank-arm is disconnected when the arm is in vertical position above the main shaft and it has brought the shaft of the can-seat between the prongs and the friction-wheels 37 and 38 in contact, whereby the carriage is held and the can-seat revolved.

The sleeve of the crank-arm is moved into gear partly by means of a spring, 42, which bears against one prong or arm of a pivoted bifurcated lever, 43. This lever is pivoted on the frame by the side of the main wheel, and the free end extends under the main shaft and vibrates in horizontal plane. The arm or prong next to the sleeve has a pin, which works in an annular groove in the end of said sleeve.

The other arm of this lever carries a friction-wheel, 144, which the spring presses constantly against the inner face of the main wheel; but the adjustment is such that when thus riding against said face it does not allow the spring to draw the sleeve to the collar far enough to interlock the clutches. At a proper place, however, in said main wheel, a curved slot is cut directly opposite the friction-wheel 144, into which said wheel may drop, thus allowing the spring to draw the sleeve of the crank-arm into connection with the clutch of the fixed collar on the main shaft. The slot is just long enough to permit one complete revolution of the main shaft while the friction-wheel is in the slot, thus advancing the carriage to transfer the can to the chute at the delivery end of the machine to return to the other end of its path and take up and bring forward to the central point another can. Then the friction-wheel rides out at the inclined rear end of the slot, and, throwing the clutch out of connection, leaves the carriage stationary with the can opposite the heater, and as the main shaft revolves continuously the can is rotated through the mechanism hereinbefore described.

For greater certainty of movement an arm, 45, Sheet 4, is placed on the inner face of the main wheel opposite the beginning of the slot in said wheel, said arm having a curved cross-piece, 46, at its outer end, opposite the beginning of said slot, adapted, by position and shape, to push the wheel 144 into the slot and lock the clutches by positive motion. The cross-piece may strike against either the wheel 144 or a stud, 47, on the end of the bearing-pin of the wheel 144.

It will be borne in mind that the carriage is locked in place against longitudinal movement in its path by means of the pronged arm 41 embracing the shaft of the rotating can-seat. The arm which supports the can-seat is also locked, both in its raised and low positions, by means of the same crank-pin which raises it; for while this pin is above the horizontal line of the pivot of the cam-lever 28 the can-seat, bar, and its arm are raised, and must remain in that position until the said pin has passed below said line. In the same way it holds down these parts, after depressing them, by its action on the lower part of the cam-lever. As the crank-arm remains in a vertical position all the while the can is rotating, its pin affords simple and certain means for locking the cam-levers, and parts carried by them, in required position.

Vertical movement, as hereinbefore described, is given to the arm which carries the can-seat principally for the purpose of taking up the cans from the end of the first chute and placing them upon the receiving end of the other. To fully accomplish this object it is necessary that the rotary can-seat should rise through the end of the chute next the end, or, more accurately, projecting over the extremity of the path of longitudinal movement of said seat. For this purpose the end of the chute next the seat is formed with an open slot, which divides the end into two bars, (marked 48 48,) which may project between the can-supporting pins in the disk. When, therefore, the can-seat is brought back to the limit of its movement, and is then raised, the pins set in the disk pass up through the slot or on the outside of the bars 48. They are preferably six in number and are symmetrically arranged in the disk, so that any two may pass upon the outside and two in the slot. They are made long enough to lift the can and free it from contact with the bars. Guide-flanges 49, on each side, serve to hold the bottom of the can in place. The end of the chute on the opposite side of the can-seat is formed with a slot and bars like that just described, and the can is left thereon by the depression of the seat by means of the same construction of parts required to take it up from the end of the first chute. Only the can-supporting pins enter the chute end by horizontal and leave it by vertical movement, the reverse of that at the beginning.

It is also obvious, as the seat is rotated before the forward movement of the carriage is completed, that it may be necessary to rectify the position of the pins before they reach the beginning of the second chute, in order that said pins may not strike the ends of the bars of the chute. For this purpose pins 149, corresponding in number and position to those on the can-seat, are set in the wheel 37, which is on the lower end of the seat-shaft. A bent arm, 50, is set in the under side of the table, exactly by the side of the path of the lower set of pins, so that if they (and consequently the upper) are in proper position, the two outside pins on one side will just graze the arm 50; but if the pins are turned out of this proper position, then one of the pins will be in line with the end of the arm, and will be struck by said end, and thereby the pins will all be brought into proper alignment. This bent arm 50 is placed so as to act on the pins directly the shaft leaves the position at which it is rotated. On the return of the carriage for another can the pins are out of range of the arm 50, but as the can-seat is not rotated it goes back unchanged in position and requires no alignment.

The can is held down upon its seat by means of an annular revolving cap-plate, 51, suspended loosely by means of clips 52 from a like plate, 53, fixed to an arm, 54, in such position that both annular plates are exactly over the can-seat. The lower plate, when pressed upward, bears against small rollers 55, suspended in the upper plate, and may turn freely thereon. It should bear accurately on the top of the can, the ends of the clips in which it hangs passing outside the can. The arm 54 is supported by a rod, 56, to which it is fixed, and by a post, 57, on which it slides freely. The rod 56 is fixed at the bottom in a base-bar, 58, the inner end of which slides on the post 57, and the outer is provided with a pin, 59, which passes loosely through the end of the arm which carries the can-seat. The lower end of this pin rests and moves on a guide-rail, 60. A coiled spring, 61, on the post 57 bears against a pin above and the base-bar below, and holds down the whole frame-work which carries the annular plates. The guide-rail determines the horizontal position of said plate, and is a trifle raised at the end 62, which is opposite the beginning of the second chute, in order that the annular plate may be slightly raised at the instant the can is left by the carriage, and so that the ends of the clips may pass freely over the top of the can on the return of the carriage. It will be understood that this annular revolving cap-plate is fitted to receive solder or solder-wire, and is set at proper distance from the seat to admit the cans, and that as the seat rises it clamps the can between itself and the said plate.

The arm 54 may be fastened by means of a set-screw at any point on the rod 56, according to the height of can to be soldered. As the cap-plate turns freely on the rollers the can, though firmly clamped between it and the seat, may rotate freely with said seat.

Pronged arms 63, fixed to a rock-shaft, 64, serve to move the cans before they are taken and after they are left by the carriage. These are necessary, first, in order to bring each can accurately into position to be taken upon the seat, and, further, for the purpose of moving the cans after soldering with like accuracy to the testing apparatus. The shaft rocks in order to insert the arms between the cans or remove them from the path of the cans at the proper moment. It has a regulated longitudinal movement in its bearings in order to push forward the cans, as required. These movements are imparted to the shaft mainly by the motion of the carriage.

On the arm 30 is a spur, 65, formed with a groove and a flange, 66, Figs. 4, 9, 10, and 11, and is adapted, when the arm 30 is lowered and moved to the right of Fig. 1, to catch under a pin, 67, in the rock-shaft. In its further movement to the right it carries, by means of this pin, the rock-shaft to the limit of its motion; then as the arm 30 rises it lifts the pin 67, rocks the shaft, and throws the prongs of the arms 63 between the cans. This pin is retained in the groove of the spur, so that as arm 30 moves to the left to feed forward the can it carries the pin and the rock-shaft with it, the pronged arms of the rock-shaft pushing the cans forward a distance equal to the diameter of a single can, and the arms are so arranged on the shaft that when thus moved one leaves the forward can at the end of the chute and directly under the center of the perforated pad hereinafter described, and the other leaves a can on the end of the first chute in position to be taken up by the carriage. At precisely the proper instant the shaft is rocked backward by means of an incline, 68, set in a slot in the table in the path of a pin, 69, on the rock-shaft. This incline can be set in the slot at any required point, which must vary according to the diameter of the cans. The pin 69, riding up on this incline, throws back the pronged arms, the pin 67 being then released from the spur 65 by being slipped past the flange 66 and out of its range. The same effect may be produced by means of the pin 200 upon the rocking shaft set in proper position, so that the arm 30 in its descent will rock the shaft backward; but the means above described are preferred, the incline being easily adjustable to any position. The arm 30 may then pass on, descend in its return to the forward limit of its motion, and again catch the pin 67 and bring back the shaft with the arms rocked back, and so on in succession.

The motion of the arm 30 must, of course, be sufficient for the largest size of cans; but the amount of motion imparted to the row of cans is accurately determined not by the motion of the arm 30, but by the incline heretofore described.

Inward movement of the arms upon the rocking-shaft may be limited in any convenient way, as by allowing one or both of the arms to come in contact with the side of the frame or chute, or by any suitable pin or stud in the shaft itself coming in contact with the top of the table.

It will be noted that both of the pronged arms which push forward the cans are adjustable by means of set-screws on the rock-shaft, to adapt them to the different sizes of cans. The motion of the arm 30 required to take up the can from the end of the first chute is in proper time to rock the shaft and throw forward the arms, and at the same time, when the carriage starts forward with the can just taken up, it brings forward the can next in order by moving the shaft and with it the arms. The rear arm of the shaft is set so as to strike in just behind the can next to that taken up by the carriage, and the front arm passes behind the can last delivered on the receiving end of the first chute. The first chute is cut out at the foot of the incline, as shown at 72, Fig. 2, in order to accommodate the rounded edge of the can bottom as the can slides down. The rock-shaft is steadied by means of a spring, 73, which bears against its under side.

Figure 4:
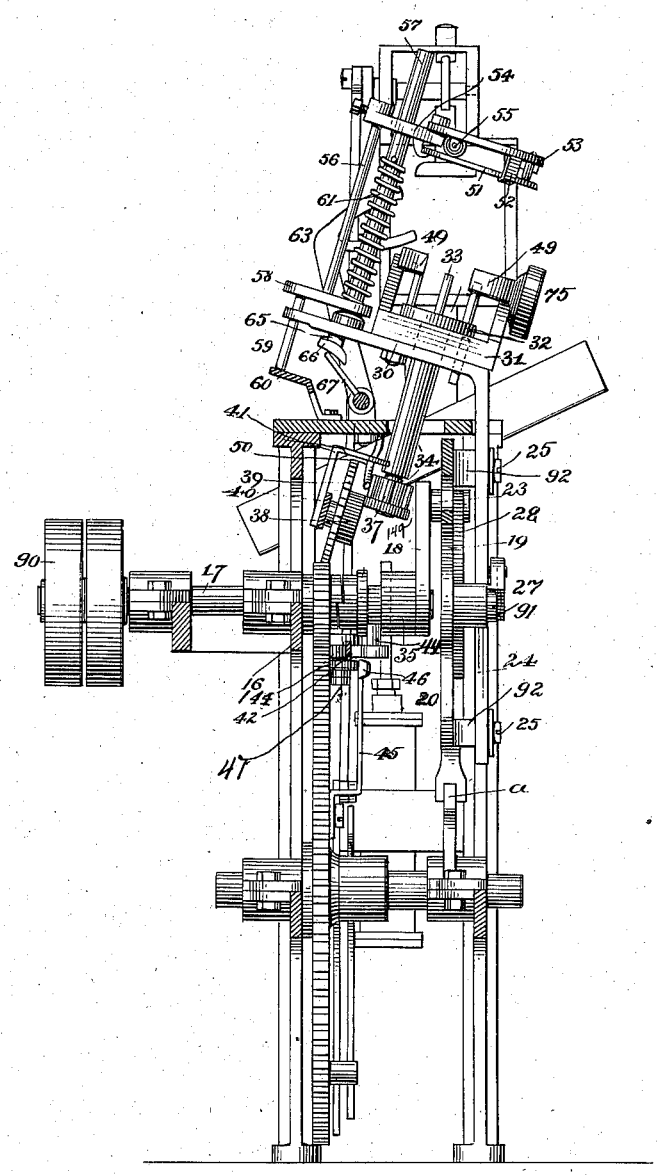
Figures 5, 6:
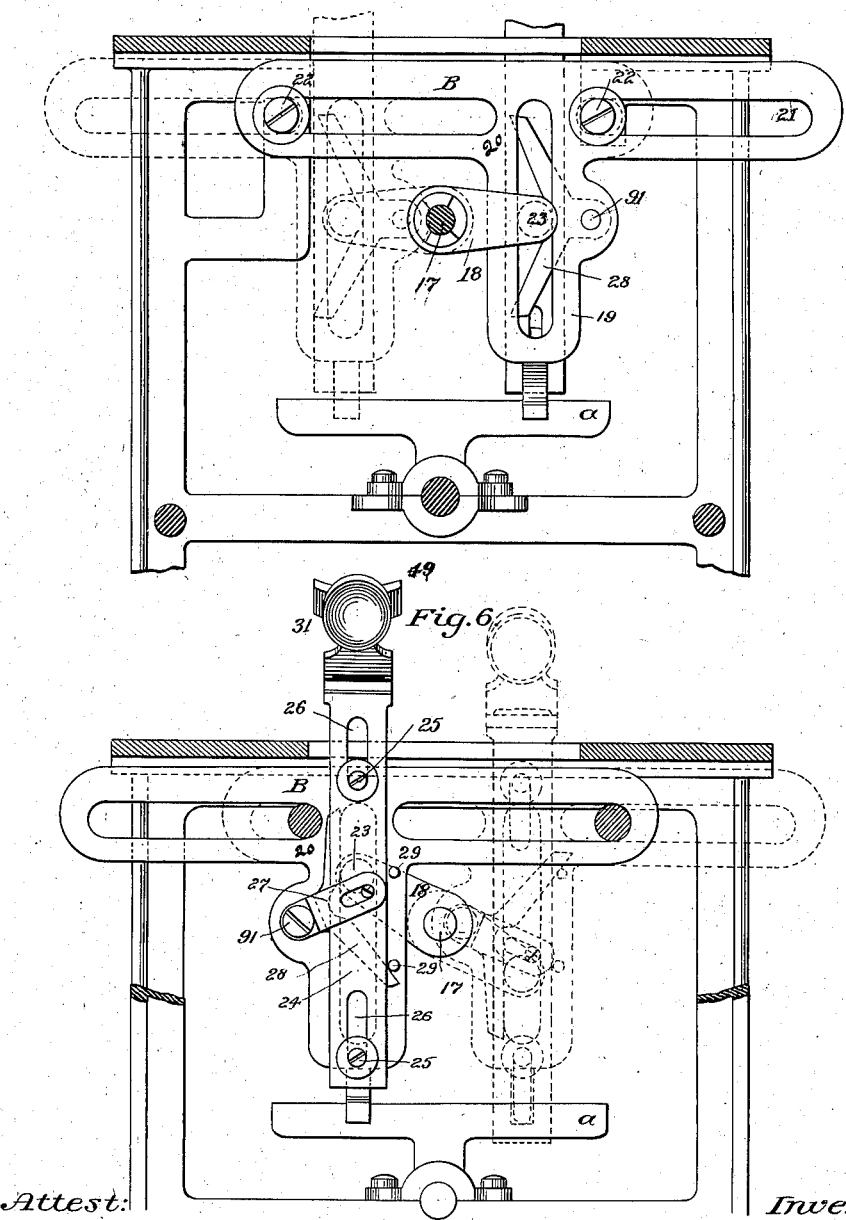

The heating appliance is shown in Figs. 2 and 4. It may be of any suitable form known in the art. A convenient form is that shown, in which a vertically-arranged cup, 75, is set on a standard on the front of the arm which supports the can-seat. The cup may have an opening into or through a flange, 49, which forms the guard on one side. These parts may be made of sheet metal, and the heat applied by the flame directed into this chamber through the cup.

It will be understood that the solder is dropped into the opening in the upper end of the can, and that the rotation and heat act to float the can in the manner well known to those skilled in the art. The openings in the stationary and revolving plates will, however, admit a soldering-iron, if desired.

The apparatus for generating and directing the flame is fixed at the point opposite which the carriage stops and the can-seat rotates, and the reciprocating carriage, moving in right lines with one can-holder, serves the purpose of bringing the cans in succession to the flame as effectively as the revolving tables heretofore known, with their numerous can-holders, and the apparatus costs less and occupies less room.

The can-testing apparatus is the same as that described in an application filed by me in the United States Patent Office on the 9th day of February, 1881, with the exception of some subordinate details, which have been modified in order to adapt this apparatus to that hereinbefore described, and to form the combined machine capable of both soldering and testing by simultaneous operations and one passage of the cans through the same machine.

The devices for closing the cans and for conducting air thereto are located at the delivery end of the second chute.

The pad, the cam, air-pipes, cylinder, piston, and valve mechanism, as well as the levers for operating the valve and pad, which presses upon the open upper end of the can, are all the same as those shown in my said application. The main wheel also operates the lever, and is driven from the main driving-shaft in the same way. The delivery-chute B' is the same also, and is lifted by the piston-rod, which strikes against a plate, 76, fixed to the side of the long end of the chute; but the locking apparatus differs therefrom. The catch 77 is fixed to the inner end of the plate 76, and takes over the edge of the table. To allow this the chute B' is permitted to slide on its supporting-rod, being pressed toward the table by a spring, 78, so as to force the catch over the edge of the table when it has passed the same. The chute is tripped by a pin, 79, on the end of the rocking-shaft at the proper moment, said pin striking against the catch and pushing it from the edge of the table. The second pronged arm on the rock-shaft takes the place of the special feed mechanism described in my said application and pushes the cans, after soldering, to the testing apparatus at the proper time, and with the same accuracy as the first arm supplies the cans to the rotating seat of the soldering mechanism. In this combined apparatus the number of parts is lessened and one handling of the cans avoided. The cans are placed by an attendant upon the inclined chute, and the same person, who need not be a skilled workman, can attend several machines. Obviously, if the testing mechanism be not used the soldering-machine discharges the cans automatically.

In the operation of the machine it will be understood that the carriage (supposed to be on its return, for illustration, from the testing-chute) goes back with the can-seat lowered. When it reaches the extreme rear limit of its movement the pin of the crank rises above the horizontal plane of its shaft, throws back the upper arm of the cam-lever, and raises the can-seat, then grasping a can and lifting it from the end of the chute. Further movement of the said crank-arm carries forward the carriage until in the center of its path, when the clutch is unlocked, the carriage remains at rest, and the rotating mechanism begins to operate. When this latter has accomplished its office, by the return of the slot in the wheel, the crank-sleeve is again clutched, and the carriage completes its forward movement. At the end of said forward movement the pin of the crank-shaft passes below the horizontal plane of the main shaft, moves back the lower arm of the cam-lever, depressing the can-seat and leaving the can; then completes the return of the carriage without interruption, and at the rear limit the can-seat is raised, as before explained. The carriage is stationary and the can rotating during about seven-eighths of the movement of the main wheel. This gives time for the soldering, and the pin on the main wheel is so arranged to strike the levers E and F, which operate valve and air-pad of the testing apparatus, that the can is charged and the testing operation of one can going on while another is soldering.

Having thus described my invention, what I claim is—

1. In a can-soldering machine, the combination of a chute for holding the cans, a reciprocating carriage and rotating can-seat, adapted to take the cans from the chute and transfer them to the flame and rotate them, and mechanisms for operating the said parts, all substantially as described.

2. In a can-soldering machine, the combination of a chute for holding cans and delivering them to a can-seat, and a rotating can-seat provided with mechanism for rotating it, and also moving it toward and from the said chute, substantially as described.

3. A reciprocating carriage provided with rotating can-seat, mechanism for operating the same, and appliances for soldering, in combination with a can-testing mechanism and a connecting-chute, whereby the cans may be soldered and tested, substantially as described.

4. The main driving-shaft, with crank-arm, sleeve, and clutches, in combination with the carriage having a slotted arm, vertically-reciprocating bar supporting the can-seat, and mechanism for raising, lowering, and locking said bar, substantially as described.

5. The combination of the crank-shaft and its pin with the slotted arm of the carriage, the vertically-reciprocating bar carrying the can-seat, and the pivoted cam-lever connected to said bar, substantially as described.

6. The horizontally-reciprocating carriage, with its vertically-reciprocating can-carrying devices, rotary can-seat, and mechanism for rotating said seat, substantially as described.

7. The reciprocating carriage and rotating and reciprocating can-seat, consisting of pins set in a base, and the slotted ends of the can-chute, the parts being adapted to operate in connection with each other and with suitable impelling mechanism substantially as set forth.

8. In combination with the slotted chute end and the pins of the can-seat, the can-seat shaft, the wheel upon its lower end, the pins set therein, and the guiding-arm 50, for aligning the pins of the can-seat with the slotted chute, substantially as described.

9. In combination with the shaft of the can-seat and its friction-wheel 37, the wheel 38 and gear-wheel 39, mounted on the spring-arm, said gear-wheel being driven from the main shaft, all substantially as described.

10. The guard-flanges and heating-chamber, set in the described relation to the revolving can-seat, said guard and chamber being set on the arm, all as set forth.

11. The vertically-movable annular plates, mounted upon post and rod on the arm 30, with clips and rollers applied to said annular plates, substantially as described.

12. The combination of the arm 54, carrying annular plates, with rod 56, post 57, spring and base bar, and with the pin 59, and a guide-plate, substantially as set forth.

13. The reciprocating rock-shaft, in combination with adjustable arms for moving the cans, and mechanism, substantially as described, for imparting rocking and longitudinal motion to said shaft, as set forth.

14. The combination, with the rock-shaft and its arms, of the pins 67 and spur 65 on the reciprocating arm 30, substantially as set forth.

15. In combination with the rock-shaft and its arms, the adjustable incline 68 and pin 69, substantially as described.

16. The combination of the main shaft, the crank-arm and sleeve, the collar adapted to interlock with said sleeve, the pronged lever 43, wheel 144 and spring 42, and the slotted main wheel, substantially as described.

17. The combination of the spring-arm 40, carrying wheel 39, the mechanism whereby said wheel rotates the can-seat, the shaft 34, and the arm 41, substantially as described.

18. The combination, with the can-testing mechanism, of the pivoted delivery-chute movable laterally on its pivot, the spring and the catch, and the rock-shaft, with its arms, whereby the catch is released when a can is moved forward, substantially as set forth.

In testimony whereof I have signed my name to this specification in the presence of two subscribing witnesses.

RICHARD GORNALL.

Witnesses:
CHAS. P. FELDHAUS,
JOHN KRUZER.